United States Patent
Roberts et al.

(10) Patent No.: US 11,243,152 B2
(45) Date of Patent: Feb. 8, 2022

(54) PIPE TESTING METHOD AND APPARATUS

(71) Applicant: VERDERG PIPE TECHNOLOGY LIMITED, Kingston upon Thames (GB)

(72) Inventors: Peter Roberts, Kingston upon Thames (GB); Alastair Walker, Kingston upon Thames (GB)

(73) Assignee: VERDERG PIPE TECHNOLOGY LIMITED, Kingston Upon (GB)

(*) Notice: Subject to any disclaimer, the term of this patent is extended or adjusted under 35 U.S.C. 154(b) by 222 days.

(21) Appl. No.: 16/624,877

(22) PCT Filed: Jun. 19, 2018

(86) PCT No.: PCT/GB2018/051699
§ 371 (c)(1),
(2) Date: Dec. 19, 2019

(87) PCT Pub. No.: WO2018/234782
PCT Pub. Date: Dec. 27, 2018

(65) Prior Publication Data
US 2020/0132576 A1 Apr. 30, 2020

(30) Foreign Application Priority Data
Jun. 20, 2017 (GB) .................................. 1709817

(51) Int. Cl.
*G01N 3/12* (2006.01)
*G01N 19/02* (2006.01)

(52) U.S. Cl.
CPC ............... *G01N 3/12* (2013.01); *G01N 19/02* (2013.01); *G01N 2203/0019* (2013.01);
(Continued)

(58) Field of Classification Search
CPC ............. G01N 3/12; G01N 2203/0048; G01N 2203/0075; G01N 2203/0274; G01N 2203/0411; G01N 2203/0019; G01N 19/02

See application file for complete search history.

(56) References Cited

U.S. PATENT DOCUMENTS

| 3,975,950 A | 8/1976 | Erdei |
| 4,192,194 A | 3/1980 | Holt |

(Continued)

FOREIGN PATENT DOCUMENTS

| CN | 106248492 A | 12/2016 |
| EP | 0 605 109 A1 | 7/1994 |

(Continued)

OTHER PUBLICATIONS

Selker et al., "Interpretation of the South Stream Ring Collapse Test Program Results", Proceedings of the Twenty-fourth (2014) International Ocean and Polar Engineering Conference, Jun. 15-20, 2014, vol. 2, p. 88-95.

*Primary Examiner* — Jonathan M Dunlap
(74) *Attorney, Agent, or Firm* — Seed Intellectual Property Law Group LLP

(57) ABSTRACT

A method and apparatus for testing rings cut from pipes for use in making subsea pipelines are described. The method for determining the whether a test ring is correctly assembled in a test chamber for testing pipes for use in making subsea pipelines comprises: mounting a test ring in a pressure chamber such that the ends of the test ring forms seals with opposing surfaces of the chamber to isolate the inside of the test ring from the outside; providing means for measuring the displacement of the test ring; providing means for measuring a force applied to the inner surface of the test ring; applying a force to the inner surface of the test ring; and using the displacement measurement and force (Continued)

measurements to determine whether the test ring is correctly mounted in the pressure chamber.

21 Claims, 9 Drawing Sheets

(52) U.S. Cl.
CPC ........... *G01N 2203/0048* (2013.01); *G01N 2203/0075* (2013.01); *G01N 2203/0274* (2013.01); *G01N 2203/0411* (2013.01)

(56) References Cited

U.S. PATENT DOCUMENTS

| | | | |
|---|---|---|---|
| 8,191,430 B2* | 6/2012 | Roberts | G01N 3/12 73/807 |
| 2010/0212405 A1* | 8/2010 | Roberts | G01N 3/12 73/49.6 |

FOREIGN PATENT DOCUMENTS

| | | |
|---|---|---|
| GB | 2 447 668 A | 9/2008 |
| WO | 2008/114049 A2 | 9/2008 |

* cited by examiner

PIPE TESTING METHOD AND APPARATUS

BACKGROUND

Technical Field

Embodiments of this disclosure relate to methods and apparatus for use in testing of pipes such as those used for forming underwater pipelines.

Description of the Related Art

In the oil and gas industry there has been a steady development over the past 20 years in the manufacture of subsea pipelines suitable for installation and operation in ultra-deep water to access deep-water reservoirs of oil and/or gas. Currently small diameter pipes of about 16 inches (about 40.6 cm) in diameter have been installed in 3000 m deep water. Larger diameter pipes of up to 32 inches (81.1 cm) in diameter have been installed in water depths of up to 2500 m. It is likely that future projects will require the installations and operation of pipes in depths up to 3500 m and perhaps even deeper.

The pipelines are typically installed empty, i.e. filled with air at ambient pressure and only filled with oil or gas under pressure once installation is complete. A major risk experienced during the installation of these deep water pipelines is from the pressure applied by the water causing the pipe to deform out of its initial virtually round shape into an almost flat configuration. This is called external pressure collapse and if not controlled can result in the total loss of the pipeline. The dimensions, i.e. the diameter and wall thickness and, to a degree, the material properties of a very deep-water pipeline are therefore the main drivers in determining the potential for external pressure collapse. This is in contrast to the design of a conventional shallow-water or onshore pipeline where the wall thickness is sized to resist internal pressure from the fluid it is to carry rather than external pressure.

To design and manufacture thick walled pipes to manufacture pipelines to operate in ultra-deep water, i.e. depths of more than 2000 m, design guidance is available in DNV OS 101 in which the safety from the pressure collapse failure during pipeline installation is determined by the use of a safety factor. The safety factor has been calibrated using the Load and Resistance Factor Design (LRFD) method in comparison with collapse pressure test results available at the time of preparation of DNV guidance. Because of the large financial implications of the loss of a very long pipeline during installation in ultra-deep water it has been the practice to further base the design of such a pipeline on specific pipe joint collapse tests in conjunction with the DNV information. However pressure testing full-scale pipe joints is an expensive procedure that requires a suitable pressure chamber. Only a few chambers capable of applying pressures corresponding to ultra-deep water are available in the world and transport of the pipes from the pipe mill to suitable test facility may be inconvenient and expensive.

An alternative approach that assists in optimizing the pipe design, in particular the pipe wall thickness, has been developed to replace the full scale pipe tests. An approach is described in WO2008/114049, which describes a method and apparatus for testing pipes for use in making subsea pipeline, which involves an external pressure collapse test on ring specimens cut and machined from manufactured pipe joints.

Embodiments of the present invention are directed to a method and apparatus for improving the accuracy of the external pressure collapse tests carried out on ring specimens, for example such as those tests described in WO2008/114049.

BRIEF SUMMARY

Embodiments of the invention provide an apparatus and method for use in testing pipes used in the manufacture of pipelines for the deep-water subsea environment.

Accordingly one aspect of the invention comprises an apparatus for testing rings cut from pipes for use in making subsea pipelines, the apparatus comprising:

first and second test chamber sections, which when connected together define a test chamber for housing a test ring sealing means for forming a seal against the ring when mounted in the chamber;

means for connecting the first and second sections together to form the chamber and to engage the sealing means against the test ring when mounted in the chamber to form a pressure resistant seal between the inside surface of the ring and the outside surface of the ring;

a fluid inlet port in one of the chamber sections to allow a pressured fluid to be admitted to the chamber outside the ring;

a hydraulic ram for applying a force against the inner surface of the ring when received in the chamber;

at least one sensor for measuring the force applied to the ring by the hydraulic ram;

at least one sensor for measuring the movement of the ring; and at least one sensor for measuring strain and deformation of the ring.

In use the test ring is positioned between the first and second test chamber sections and engaged with the sealing means, such that the inner surface of the ring is isolated from the outside surface of the ring. The inner surface of the ring is exposed to atmospheric conditions. The outside surface of the ring can be exposed to a pressurized fluid in the chamber.

The apparatus can comprise means for pumping fluid to the hydraulic ram. Preferably the means for pumping fluid to the hydraulic ram is a needle pump.

Preferably the apparatus comprises at least two sensors for measuring the movement of the test ring. The sensors measuring the movement of the test ring are preferably displacement transducers. The sensors measure the movement of the test ring relative to the chamber sections, in which it is mounted.

The sensor for measuring the force applied to the test by the hydraulic ram is preferably a force meter.

The opposing surfaces of the test chamber sections are provided with at least one circumferential groove. Sealing means are located in each of the grooves. Preferably each of the test sections are provided with two circumferential grooves in this surface. The sealing means are preferably elastomeric O-rings.

The apparatus can further comprise a spacer ring, located between the first and second sections. The spacer ring taken with the first and second sections can define the test chamber for receiving the ring.

A further aspect of the invention comprises a method for determining whether a test ring is correctly assembled in a test chamber for testing pipes for use in making subsea pipelines, wherein the test ring is cut from a pipe of the type used to make the pipeline and has flat substantially parallel surfaces on the end of the test ring; the method comprises:

i) mounting the ring in a pressure chamber such that the ends of the ring form seals with opposing surfaces of the chamber to isolate the inside of the ring from the outside;

ii) providing means for measuring the displacement of the test ring;

iii) providing means for measuring a force applied to the inner surface of the test ring;

iv) applying a force to the inner surface of the test ring;

v) measuring the displacement of the test ring and force applied; and vi) using the displacement measurements and force measurements to determine whether the test ring is correctly mounted in the pressure chamber.

An increasing force is applied to the inner surface of the test ring during the test over a predetermined time and at a predetermined rate. If the displacement measurements and force measurements show that the restraining force applied by the sealing means are outside the allowable ranges of forces the subsequent pressure collapse test on the test ring would not proceed. If the results show that the restraining forces are within the allowable ranges the pressure collapse test can proceed.

The maximum acceptable forces depend on the outside diameter of the test ring. For example, for a ring with an outside diameter of about 30 in (76.2 cm) preferably the maximum acceptable force applied by the hydraulic ram will be in the range of 0.1 kN to 6.5 kN. However the range of acceptable forces will also depend on the pressure in the pressure chamber. With no pressure applied to the pressure chamber the maximum acceptable force for a ring with an outside diameter of about 30 in (76.2 cm) would preferably be in the range of 0.1 to 0.4 kN, preferably about 0.25 kN. If the pressure chamber is pressurized, for example with a pressure of 27 MPa the maximum acceptable force would be in the range of 4.5 to 6.5 kN, preferably about 5.0 kN. The maximum allowable forces for diameters other than 30 in (76.2 cm) can be determined prior to the tests.

When the force is applied to the inner surface of the test ring, the pressure in the pressure chamber can be at about 0 MPa. Preferably the test can be carried out with the chamber pressurized, such that a pressure is applied to the outer cylindrical surface of the test ring. In this situation the test is carried out having the pressure in the pressure chamber above 0 MPa but below the expected collapse pressure of the pipeline. The test can be carried out wherein the pressure in the pressure test chamber is in the range of above 0 to 30 MPa, preferably about above 0 to 15 MPa. The pressure in the pressure chamber can be in the range 0 to 0.7 times the expected collapse pressure of the pipeline, preferably 0.5 to 0.7 times the expected collapse pressure.

The method can further comprise stopping the applied force to the inner surface of the test ring once the test ring has been displaced to a predetermined distance, i.e. step iv) is stopped once the test ring has been displaced to a predetermined distance. Preferably the predetermined distance is about 1 mm-2 mm, preferably about 1 mm. Once the sensors have detected the test ring has been displaced to a predetermined distance, pumping of the fluid into the hydraulic ram is stopped, and the obtained measurements can be used to determine whether the test ring has been correctly installed in the test chamber.

The steps of applying a force to the inner surface of the test ring and measuring the displacement of the test ring and force applied can be repeated, with the outer cylindrical surface of the test ring subjected to a different pressure from the first pressure applied, when the force is applied to the inner surface of the ring.

Before the method is carried out a test using the same apparatus can be carried out to determine a range of allowable restraining forces. Therefore in one embodiment of the invention the test can further comprises determining a range of allowable restraining forces before carrying our steps i) to vi).

In this test the force application and measurement step can be carried out more than once, preferably each time on a new test ring. When the force application step is repeated the method can comprise providing a second pressure to the pressure chamber, wherein the second pressure is above 0 MPa and below the expected collapse pressure, when applying a force to the inner surface of the test ring. The step can be repeated further with the method further comprise providing a third pressure to the pressure chamber, wherein the third pressure is above 0 MPa and below the expected collapse pressure, when applying a force to the inner surface of the test ring, the third pressure being different than the first and second pressures.

The result from the test carried out can be used to confirm whether there is an acceptable restraint force between the test apparatus and the test ring. The restraint force will depend on the geometry of the ring, i.e. the diameter and width of ring, and on the pressure in the pressure chamber. However, in some embodiments the acceptable restraint force is in the range of 0.1 kN to 30 kN. Where the pressure in the ring pressure chamber is about 0 MPa, preferably the acceptable force was in the range of 0.1 kN to 0.4 kN, preferably about 0.2 kN. When the pressure in the chamber is about 27.6 MPa preferably the acceptable restraint force was in the range of 4.5 to 6.5 kN, preferably about 5.0 kN.

The method further comprises the step of maintaining the test ring in the pressure chamber and carrying out an external pressure collapse test on the test ring. The external pressure collapse test can comprise:

providing means for measuring strain and deformation of the test ring;

increasing the pressure outside the ring and measuring the strain and deformation on the test ring as the pressure increases; and determining the external collapse pressure of the test ring.

Determining the collapse pressure of the test ring comprises determining a comparison of pressure applied to the outside of the ring and maximum strain measured to detect the onset of accelerating non-linear reduction in ring diameter with increasing pressure.

Before mounting the ring in the chamber the method can further comprise the steps of:

cutting a ring from a pipe of the type used to make the pipeline; and forming flat substantially parallel surfaces on the end of the ring.

A further aspect of the invention comprises a method for testing pipes for use in making subsea pipelines, comprising:

cutting a ring from a pipe of the type used to make the pipeline;

forming flat substantially parallel surfaces on the end of the ring;

mounting the ring in a pressure chamber such that the ends of the ring forms seals with opposing walls of the chamber to isolate the inside surface of the test ring from the outside surface;

providing means for measuring the displacement of the test ring;

providing means for measuring a force applied to the inner surface of the test ring;

applying a force to the inner surface of the test ring;

measuring the displacement of the test ring and measuring the force applied to the inner surface;

using the displacement measurements and force measurements to determine whether the test ring is correctly assembled in the pressure chamber;

providing means for measuring strain and deformation of the ring;

increasing the pressure outside the ring and measuring the strain and deformation on the ring as the pressure increases; and determining a comparison of pressure applied to the outside of the ring and maximum strain measured to detect the onset of accelerating non-linear reduction in ring diameter with increasing pressure.

Applying a force to the inner surface of the test ring, comprises applying the force until the applied force to the test ring exceeds the lateral resisting force between the sealing means and the test ring. Means are provided for applying the force to the inner surface of the test ring. Preferably a hydraulic ram is provided to apply a force to the inner surface of the test ring. The hydraulic ram is connected to a pump for supplying a fluid to the hydraulic ram. Preferably the pump is a needle pump. Preferably opposing walls of the pressure chamber are each provided with sealing means such that the ends of the ring forms engage with the opposing sealing means to isolate the inside surface of the ring from the outside surface of the ring.

The fluid is supplied to the ram to increase the force applied to the inner surface of the test ring. During the test the rate of force applied is from about 0.002 kN/min to about 0.04 kN/min. Preferably the force is applied to the inner surface of the test ring over a period of 30 mins to 4 hours, preferably 1 to 3 hours, more preferably 1 to 2 hours.

The means for applying a force to the inner surface of the test ring is removed from the test ring before the step of increasing the pressure outside the ring is carried out.

Preferably the method is carried out using the apparatus as described above.

A further aspect of the invention is a pipe testing apparatus for performing the testing method as described above.

BRIEF DESCRIPTION OF THE SEVERAL VIEWS OF THE DRAWINGS

Embodiments of the present invention will now be described, by way of example only with reference to the accompanying drawings, in which.

DETAILED DESCRIPTION

Figure 1:
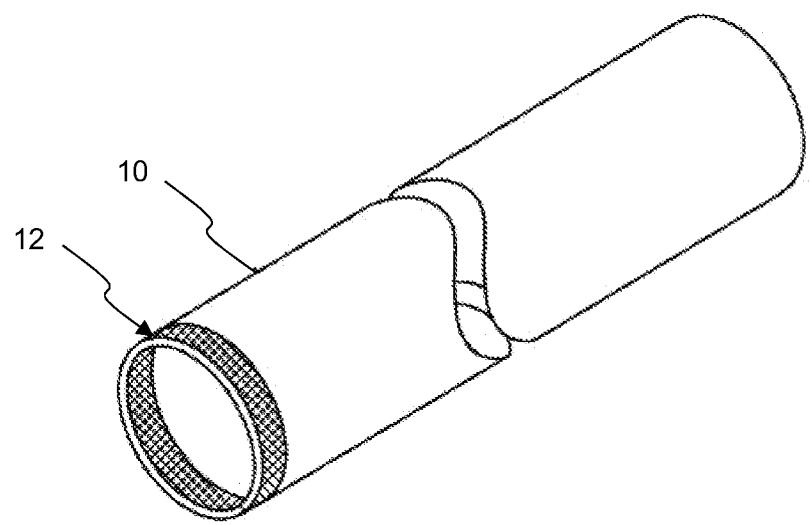
FIG. 1 shows a pipeline of the type used for testing in accordance with an embodiment of the invention.

Tests on long sections of individual pipe joints have shown that the deformations that lead to external collapse are virtually uniform along the pipe length. This observation is supported by theoretical studies, practical tests and numerical modelling. The implication is that the occurrence of external pressure collapse will be the same for a ring cut from the pipe as for the complete joint length of pipe that is subjected purely to external pressure. Therefore a testing approach based on cutting short sections from a pipe and machining the ring to a uniform length has been developed, as described in WO2008/114049. However it is important the test ring is correctly set up in the testing apparatus, before such a pressure collapse test is carried out.

By "pressure collapse test" or the equivalent it is meant for a test in which the pressure at which a test ring specimen is subjected to increasing pressure to determine the pressure at which the ring will collapse, for example a test as described in WO2008/114049 or Selker et al, Proceedings of the Twenty-fourth (2014) International Ocean and Polar Engineering Conference, vol. 2, p. 88-95.

The purpose of the sealing rings between the two cut surfaces of the ring and the chamber sections between which the ring is clamped is to help establish a pressure test chamber on the outside of the test ring. The pressure chamber is defined by the outer surface of the test ring and the surfaces of the test apparatus. During the second stage of the test, pressure in the chamber causes the ring to deform due to the compressive stresses around the ring circumference induced by the applied pressure. Increasing pressure in the chamber eventually causes the ring to collapse. In order to create a seal sufficient to prevent leakage of high pressure hydraulic fluid it is necessary that the sealing ring is subjected to an appropriately high pressure at the interfaces between the sealing rings and the faces of the test ring.

The interface pressure has the effect of causing a friction restraint force between the ring and the test apparatus. The restraint force varies as the pressure in the chamber also varies. The restraint force can be reduced by applying lubricant at the outset of the test to the rubber-steel interface, i.e. between the sealing rings and the faces of the test rings. The initial setting for the interface pressure, and hence the restraint force, can be determined by the ring test equipment and the degree of interface pressure applied to the sealing rings. The restraining force and the final collapse pressure can also be affected by the manner in which the lubricant is applied and the position of the ring during set up of the apparatus.

Variations in restraint force during the initial set up of the testing equipment, can result in inconsistent results from one pressure collapse test to another. Furthermore the restraint forces between the sealing rings and the faces of the test rings may increase the pressure level at which rings collapse. Therefore for each pressure collapse test an initial test is carried out to determine whether the test ring is correctly assembled in the test equipment.

A test method for testing pipes for use in making subsea pipelines according to one embodiment of the invention therefore includes two test stages a first test stage (S1) and a second test stage (S2). The first test stage is a setup test stage (S1) to determine whether the test ring is correctly set up in the test apparatus. The second test stage is a pressure collapse test stage (S2), to determine the collapse pressure of the pipe.

In the setup test stage, a force is applied to the inner surface of the test ring and the displacement of the test ring is measured, to assist in determining whether the test ring is correctly setup in the apparatus. In the second pressure collapse test stage (S2), an increasing pressure is applied to the outside surface of the ring to determine the collapse pressure of the pipe. The strain and deformation measurements obtained in this stage can be used to determine a suitable wall thickness for pipes. The second test stage (S2) is carried out only once the results of the first test stage indicate the test ring is correctly set up in the testing apparatus.

Figure 2:
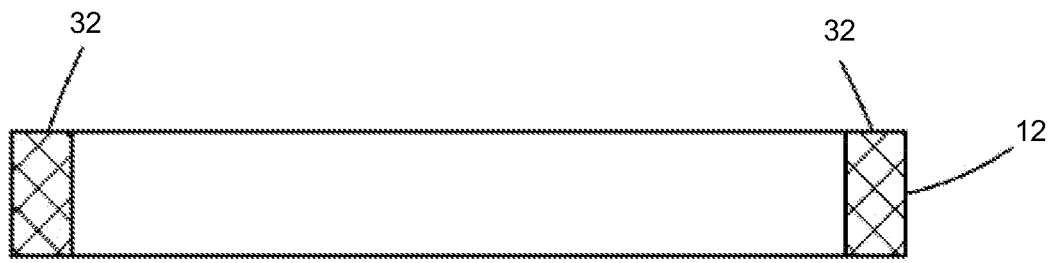
FIG. 2 shows a cross section of a test ring cut from the pipe of FIG. 1.

FIG. 1 shows a pipe 10 used in subsea pipelines. A typical example will be about 12.2 m long and have an external diameter of 508 mm and a wall thickness of 35 mm. The test ring 12 (also shown in FIG. 2) is cut from one end of the pipe and has a typical length of 50 mm, i.e. greater than the wall thickness. Even after this length of ring has been cut, the pipe can still be used in the construction of a pipeline. The end surfaces of the ring are machined so as to be substantially parallel and flat, i.e. as smooth a surface as practice. By substantially flat and parallel it is meant that there is a tolerance of ±0.01 mm on the overall length of the ring. Preferably the roughness factor should not exceed ISO Grade N6.

A test ring that has been cut from a pipe, and had the end surfaces of the ring machined is mounted in a rigid frame, comprised of at least two sections and sealing means, such that a pressure chamber is formed. The sealing means allows the machined faces of the test ring to be sealed against the apparatus such when the chamber is pressurized, pressure is applied only to the outer cylindrical surface of the ring. The inner cylindrical surface of the ring is maintained at atmospheric pressure.

The seals on both machined flat faces of the ring are such that in the second stage (S2) deformations of the circular faces of the rings are impeded. The seals on the flat faces of the ring are such that during testing the pressure is constrained to be on the outer circular surface of the ring only and only on a small area of the flat machined faces. The seals are such that the ring is subject to relatively small forces parallel to the machined flat faces such that during the test stage (S2) the radial deformations of the ring are impeded.

The first stage of the test procedure (S1) can involve the following steps:

i) Mounting a test ring into the test apparatus with the seals in place such that a chamber is defined by the outer surface of the test ring and the apparatus, the test ring having been cut from the pipe and had its ends machined flat and parallel to within prescribed tolerances;

ii) Attaching means to measure the displacement of the test ring iii) Attaching means to apply a force to the inner surface of the test ring;

iv) Applying a force to the inside surface of the ring, recording the force applied to the test ring and the displacement of the test ring relative to the apparatus;

Between steps iii) and iv) the following step can also be performed: applying pressure to the outer cylindrical surface of the ring and ensuring the seals are active and effective.

A hydraulic ram is incorporated into the test apparatus such that it contacts one side of the inner surface of the test ring, to apply a force to the inner surface of the ring. A force meter is placed between the end of the ram and inner surface of the test ring. Displacement transducers are attached to the test ring to measure any movement of the test ring relative to the test equipment.

The hydraulic ram is connected to a needle pump that injects hydraulic fluid, or other suitable fluids such as water, into the ram under pressure. The ram extends as the levels of pressure increases and contacts the inside surface of the test ring, applying a force to the surface. The pressure in the ram is increased at a very slow rate by continuous pumping of the needle pump. As the pressure increases so does the force that is applied to the ring by the ram, which is measured by the force meter. The force eventually exceeds the (until now) unknown restraint forces and the ring moves laterally. The movement of the test ring is measured by the displacement transducers. The movement of the test ring would preferably be limited to 1 mm. Once it has been determined that the test ring has moved approximately 1 mm, pumping of fluid into the ram will stop.

At regular time intervals the needle pump inserts a small volume of fluid into the ram chamber, increasing the force applied to the test ring at a very slow rate. Preferably the rate of displacement caused by the increasing force applied by the hydraulic ram is in the range of 0.01-0.05 mm/min, more preferably the rate of displacement is in the range of about 0.01-0.03 mm/min.

Preferably the first stage (S1) of the test is carried out over substantially the same time period over which the second stage (S2) of the test will be carried out. The pressure to the ram, and as such the force to be applied to the inner surface of the ring, can be increased over a time period of about 30 mins to about 4 hours, preferably over a time period of from about 1 to about 2 hours. The rate of force application by the hydraulic ram to the inner surface of the test ring would be in the range from about 0.002 kN/min to about 0.04 kN/min.

As the force is applied to the inner surface of the ring, the pressure is maintained in the pressure chamber at a predetermined pressure. The first stage can be carried out with the pressure in the chamber at 0 MPa. Alternatively, the test can be carried with the chamber pressurized. The chamber can be pressurized up to a pressure below the expected collapse pressure. The test can be carried out wherein the pressure in the pressure chamber is in the range of above 0 to 30 MPa, preferably about above 0 to 15 MPa, more preferably above 0 to 6 MPa. Preferably the maximum pressure in the chamber that may be used in the test is 0.5 to 0.7 times the expected collapse pressure test.

Before the set up test is carried out to determine whether the test ring is suitably mounted in the test apparatus to subsequently carry out a pressure collapse test, initial tests are carried out to determine the restraining force effects for the particular set up used. These initial commissioning tests are carried out as for the S1 test. The measured forces applied by the ram, in the initial commissioning tests are used in numerical modelling to determine if the forces would result in excessively large collapse pressure. For example the initial commissioning test procedure can be carried out comprising:

i) Mounting a test ring into the test apparatus with the seals in place such that a chamber is defined by the outer surface of the test ring and the apparatus, the test ring having been cut from the pipe and had its ends machined flat and parallel to within prescribed tolerances;

ii) Attaching means to measure the displacement of the test ring to the test ring;

iii) Attaching means to apply a force to the inner surface of the test ring;

iiia) Applying a first pressure to the outer cylindrical surface of the test ring;

iv) Applying a force to the inside surface of the test ring, recording the force applied to the test ring and the displacement of the test ring relative to the apparatus.

Once the results of the first test are obtained, steps i) to iv) are repeated applying a second pressure in step iiia). The test may be repeated further applying a third pressure in step iiia). The first, second and third pressures are different from each other. The results of these tests can be used to determine a range of allowable restraining forces.

As a result of the initial commission testing and numerical modelling a range of allowable restraining forces is established, which are used in the set-up test, S1, to determine, if the test ring is assembled in an acceptable manner in the test equipment and therefore the ring collapse test can proceed.

If the set-up test, S1, were to show that the restraining forces applied by the sealing rings were outside the allowable range of forces the test should not proceed. The equipment should be dismantled and the ring inspected. Subsequently the test ring can be re-assembled with the test apparatus for a repeat of the initial setup test.

Once it has been determined that the test ring is correctly setup in the testing apparatus, the hydraulic ram and displacement sensors can be removed from apparatus without disturbing the position of the test ring in the apparatus and the second stage of the testing procedure, i.e. the pressure collapse test, can be initiated.

The test stage (S2), the collapse pressure test, can be carried out as described in WO2008/114049, to determine the collapse pressure of the test ring, and can comprise the following steps:

Fit attachments to measure the strain and deformations of the ring to a ring located in the frame with the seals in place;

Increase the pressure applied to the outside of the ring, recording the strain and deformation measurements; and Continue to increase the pressure until a maximum value is attained, that is until occurrence of external pressure collapse.

It may be useful to also plot a curve of pressure applied against maximum strain measured to detect the onset of accelerating non-linear reduction in ring diameter with increasing pressure that is independent of any leakage of hydraulic fluid past the seals.

For the first stage of the test method devices used to apply the forces to the outer circular surface of the ring and measure the displacement of the ring are attached to the outer surface. In the second stage the devices used to apply the forces to the inner cylindrical surface and measure the displacement are removed and devices to measure the strain and deformations that are caused by the pressure on the outer cylindrical surface of the ring are attached to the inner surface of the ring.

Two pumps are used in the test method. One pump supplies fluid to the hydraulic ram to cause the ram to apply a force to the inner surface of the test ring. The other pump, for example a further hydraulic pump provides pressurized fluid to the pressure chamber, e.g. to the space surrounding the outer surface of the ring.

Pressure is applied from an external pump such that the pressure is increased or decreased by the addition or subtraction of a specified volume of fluid to or from the space surrounding the outer circular surface of the ring. This arrangement allows the radial deformations of the ring caused by the pressure on the outer cylindrical surface to increase or decrease in a controlled manner. As the pressure is increased strain and deformation measurements are recorded until a maximum pressure has been reached.

Figure 3:
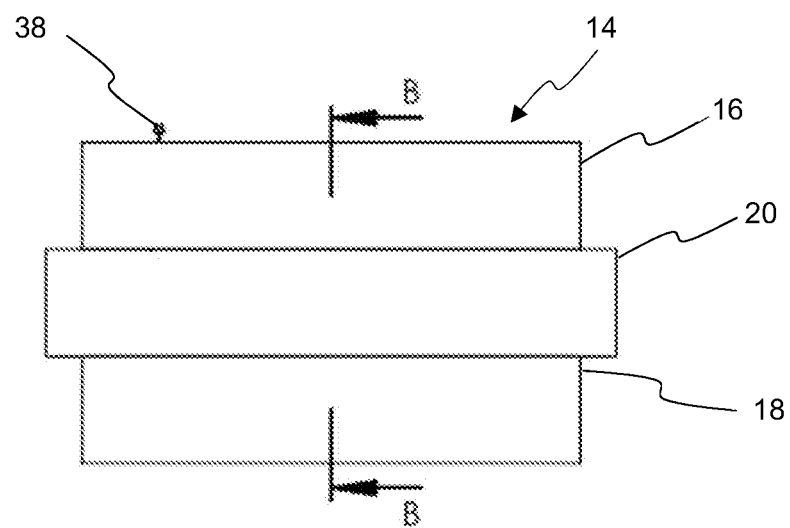
FIG. 3 shows a schematic view of a test apparatus according to an embodiment of the invention.

As shown in FIG. 3, the test apparatus 14, which can be used to carry out the testing method, comprises a first cylindrical section 16 and second cylindrical section 18 with a spacer ring section 20 located therein between define the apparatus in which the test ring 12 can be mounted. The first and second section can form the top and bottom sections of the apparatus respectively. The outer diameter of the first section corresponding substantially with the outer diameter of the second section.

The first section can be in the form of a ring, having a central aperture 42. The central aperture of the first section provides access to the center of the test equipment and the inner surface of the test ring, for the attachment of the sensors and hydraulic ram. The second section can also be in the form of a ring, having a central aperture. The diameter of the aperture of the second section corresponds substantially with the diameter of the aperture in the first section. Alternatively the second section can be in the form of a cylindrical section having a bottom portion in the form of a solid plate and a top portion in the form of the ring, such that the second section has a central void. The central void corresponding substantially to the central aperture of the first cylindrical section. The diameter of the void of the second section corresponds substantially with the diameter of the aperture in the first section.

The opposing surfaces of the first and second sections, i.e. the bottom surface of the first section and the top surface of the second section, are stepped forming a shoulder 44 extending circumferentially around the bottom and top edge of the first 16 and second 18 sections respectively. This provides a protruding annular stepped section 46 between the shoulder and the aperture of each section. The shoulder 44 of each section provides a support surface between which to locate the spacer ring 20. While the annular stepped section 46 of each of the first and second sections provides a support surface on which to mount the test ring 12. The outer diameter of the annular stepped section corresponds substantially with the inner diameter of the spacer ring 20.

The spacer ring 20 is located between the two sections 16, 18, at their outer edge. The edges of the spacer ring abut the shoulders 44 of each section and the inner circumferential surface of the spacer ring 20 will abut the side surfaces of the annular stepped sections 46. The spacer ring 20 assists in adjusting the distance between the two faces of the first and second sections. The spacer ring, and first and second sections, when taken together form a frame for holding the test ring 12 to be tested. The inner diameter of the spacer ring 20 is smaller than the outer diameter of the first 16 and second 18 sections, and larger than the diameter of their respective aperture and void. The outer diameter of the spacer ring 20 is larger than the outer diameter of the first 16 and second 18 sections.

Referring to FIGS. 4 to 8 when the testing ring is positioned into the apparatus a test pressure chamber 26 is defined between the top and bottom surfaces of the bottom and top sections, the inner side surfaces of the spacer ring and the outer cylindrical surface 40 of the test ring. The apparatus is provided with an inlet port 38 to supply pressurized fluid to the pressure chamber 26.

Figure 4:
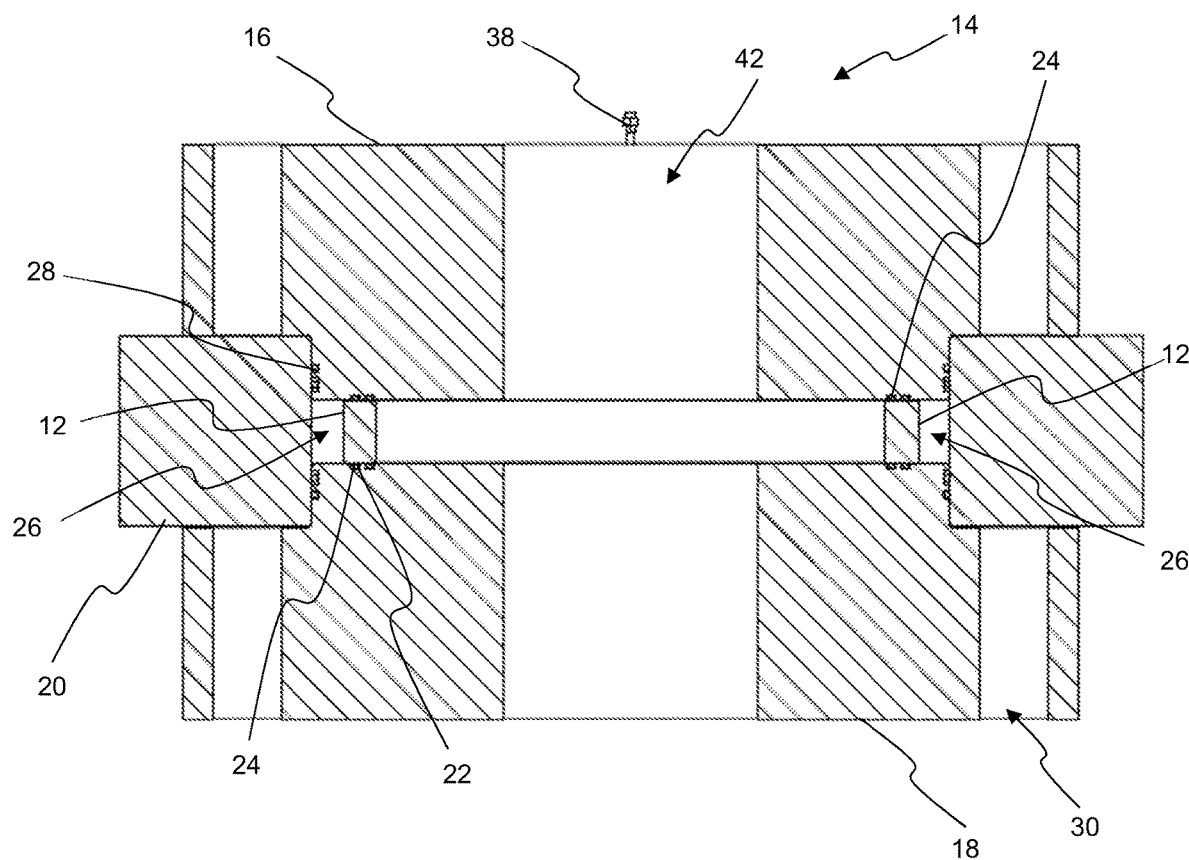
FIG. 4 shows a section on line B-B of FIG. 3, wherein the test apparatus is set up for the test stage.
Figure 6:
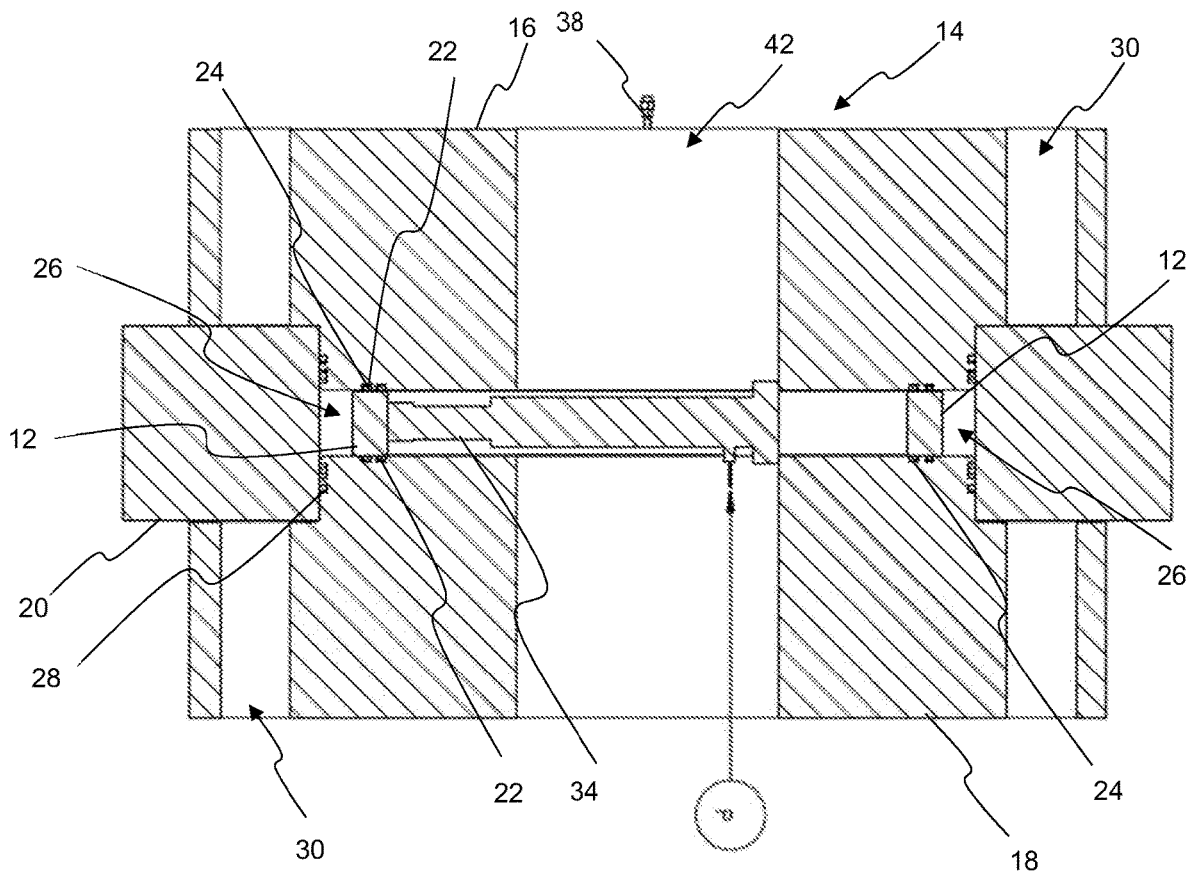
FIG. 6 shows a section on line B-B of FIG. 3, set up for the preparation stage.

Each of the first and second sections having at least one circumferential groove 22 for holding sealing means 24 in their opposing faces. As shown in FIGS. 4 and 6 each of the sections have two concentric grooves for holding sealing rings provided in the opposing faces of the annular stepped section 46 of the first 16 and second 18 sections. The test ring engages with the sealing means 24 located in the groves 22. Preferably the test ring is engaged with the sealing means 24 but does not contact the opposing face of the first and second sections. Additional sealing 28 means are provided between the spacer ring 20 and the side surfaces of the annular stepped sections 46 of the first 16 and second 18 sections. In some embodiments shims (not shown) are used between the upper surface of the spacer ring 20 and the lower surface of the first section 16 and between the lower surface of the spacer ring 20 and the upper surface of the second section 18 to align the components. The shims may be metal shims, for example brass shims. The shims may help ensure the ring does not contact the first and second section during testing, to help ensure that the pressure between the sealing rings and test ring is sufficient to prevent leakage during testing but is as low as possible to avoid excessive friction restraint being applied to the test ring.

Figure 5:
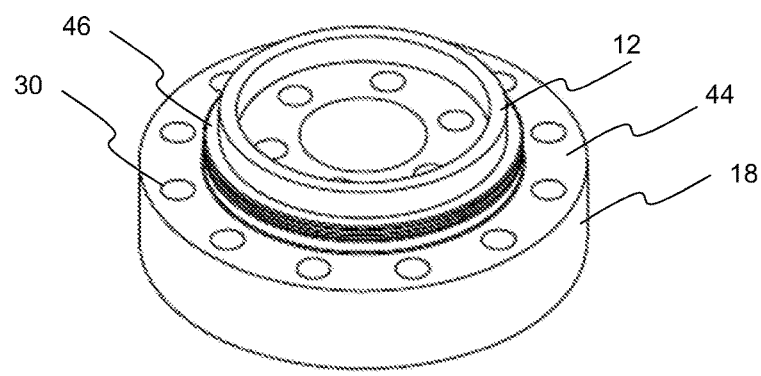
FIG. 5 shows a schematic view of a test apparatus having a test ring mounted therein.
Figure 7:
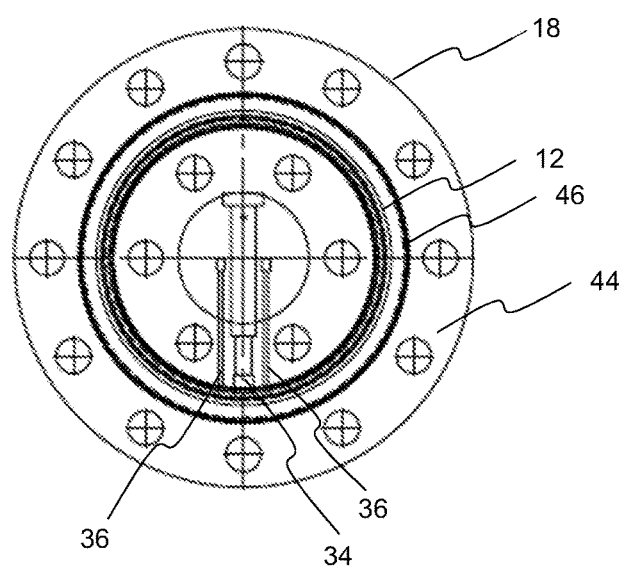
FIG. 7 shows a top view of a test apparatus and test ring set up for the preparation stage.
Figure 8:
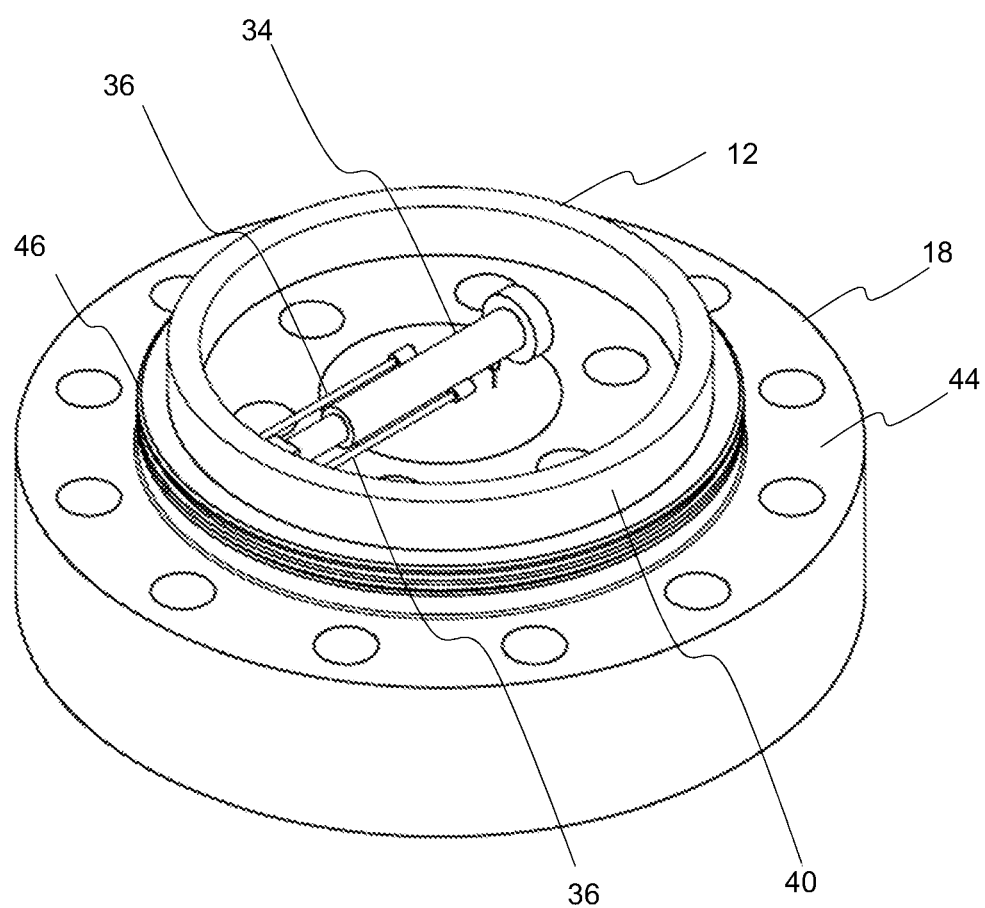
FIG. 8 shows a schematic view of a test apparatus and test ring set up for the preparation stage.

FIGS. 4 and 5 show one embodiment of an apparatus 14 according to an embodiment of the invention, set up with a test ring 12 for carrying out the collapse pressure test (S2). FIGS. 6 to 8 show one embodiment of an apparatus 14 according to the invention, set up with a test ring 12 for carrying out the initial setup test (S1). The test ring 12 is mounted between the top section 16 and lower section 18 which with the spacer ring 20 define the test chamber 26. Sealing means 24, in the form of rubber O-rings are provided in circumferential grooves in the faces of the top and bottom sections. A first set of two sealing means 24 are provided between the top section and the test ring and second set of two sealing means 24 are provided between the bottom section and the test ring.

In use the O-rings or pressure energized pressure containing seals provided on the bottom face of the top section and top face of the bottom section are engaged by the test ring to form the annulus defined by the opposing inner cylindrical side surface of the spacer ring and the outer cylindrical side surface of the test ring, and by the opposing top surface of the bottom section and the bottom surface of the top section. The annulus that is defined provides the pressure chamber into which a pressurized hydraulic fluid can be introduced. The central void of the apparatus is open to the atmospheric pressure such that during testing the outer surface of the ring is exposed to atmospheric pressure.

The top and bottom sections are held together by mechanical sealing means, for examples screws (not shown). Around the outer edge of the apparatus the screws extend through holes 30 in the top section 16 and spacer ring 20 to engage with holes 30 in the bottom section 18. Near the center of the apparatus additional securing means can extend through the holes 30 in the annular stepped section 46 of the top section and engage with holes in the annular stepped section 46 of the bottom section 18. Any number of securing means can be used to ensure proper clamping of the sections together. Other suitable securing means can be used to clamp the sections of the test apparatus together, such as a hydraulic piston arrangement.

The force with which the top and bottom sections and the spacer ring are held together is sufficient to make the annulus pressure tight internally and externally against the pressure containing seals. The tolerance with which the ring is cut from the pipe is such that no leakage occurs from the annulus (pressure chamber) into the void whilst at the same time avoiding undue restraining friction on the radial movement inwards of the ring outer diameter under hydraulic loading. The set up test (S1) is carried out to determine whether the restraining forces are within the allowable limits, when the test equipment is set up.

Referring to FIGS. 6 to 9, during the first set up test stage (S1) the testing apparatus comprises a hydraulic ram 34 in contact with the test ring. Two sensors in the form of displacement transducers 36 are positioned to measure the movement of the test ring during the testing. Whilst two displacement transducers are shown, any suitable number of sensors may be used, for example, one, two, three, four or more displacement transducers may be used. The displacement transducers may be linear voltage displacement transducers (LVDT). A force meter (not shown) is located to measure the force applied by the ram 34 to the inner cylindrical surface of the test ring 12. A needle pump (P) supplies fluid to the hydraulic ram. The needle pump supplies the fluid a predetermined rate, to increase the force applied by the ram to the test ring.

Referring to FIG. 4, during the second collapse pressure test stage (S2) the hydraulic ram and associated sensors are removed from the equipment 34. Sensors (not shown) for measuring the strain and deformation of the ring are attached, and the second stage of the test can be carried out.

The method and apparatus according to embodiments of the invention allow the testing of the representative sample of test rings taken from all the line pipe joints required for a long deep-water pipeline to give direct physical quantified evidence of the capacity of each of these specimens to resist external hydrostatic collapse.

By carrying out the initial test prior to the ring pressure collapse test, improves the accuracy of the collapse tests, by ensuring that the test ring is correctly assembled in the test apparatus. Carrying out the initial test helps each collapse pressure ring test to be consistent with each other and help in preventing unacceptable results due to erroneous application of the ring pressure collapse test.

Example

Tests were carried on steel test rings, D/t=20.5, using three example pressures in the pressure chamber, 0, 13.8, and 27.6 MPa. The test rings had been cut from a pipe with an outside diameter of 32 in (812.8 mm) and a wall thickness of 39 mm. The test rings were 50 mm long.

The test rings were mounted in the testing equipment in a manner that replicates the situation for a collapse pressure test. A hydraulic ram is positioned and attached to the test ring.

Pressure in the pressure chamber was first applied at one of the example pressures 0, 13.8, and 27.6 MPa. The pressure in the ram was then increased at a slow rate. The force applied by the ram was measured and the lateral body movements of the ring were measured by two displacement transducers. Each test used a different steel ring and new rubber sealing rings. The time and measured loads on the ram were recorded, with each test lasting about 120 minutes. The force rate was measured as increasing from about 0.002 kN/min to about 0.04 kN/min over the test.

Figure 9A:
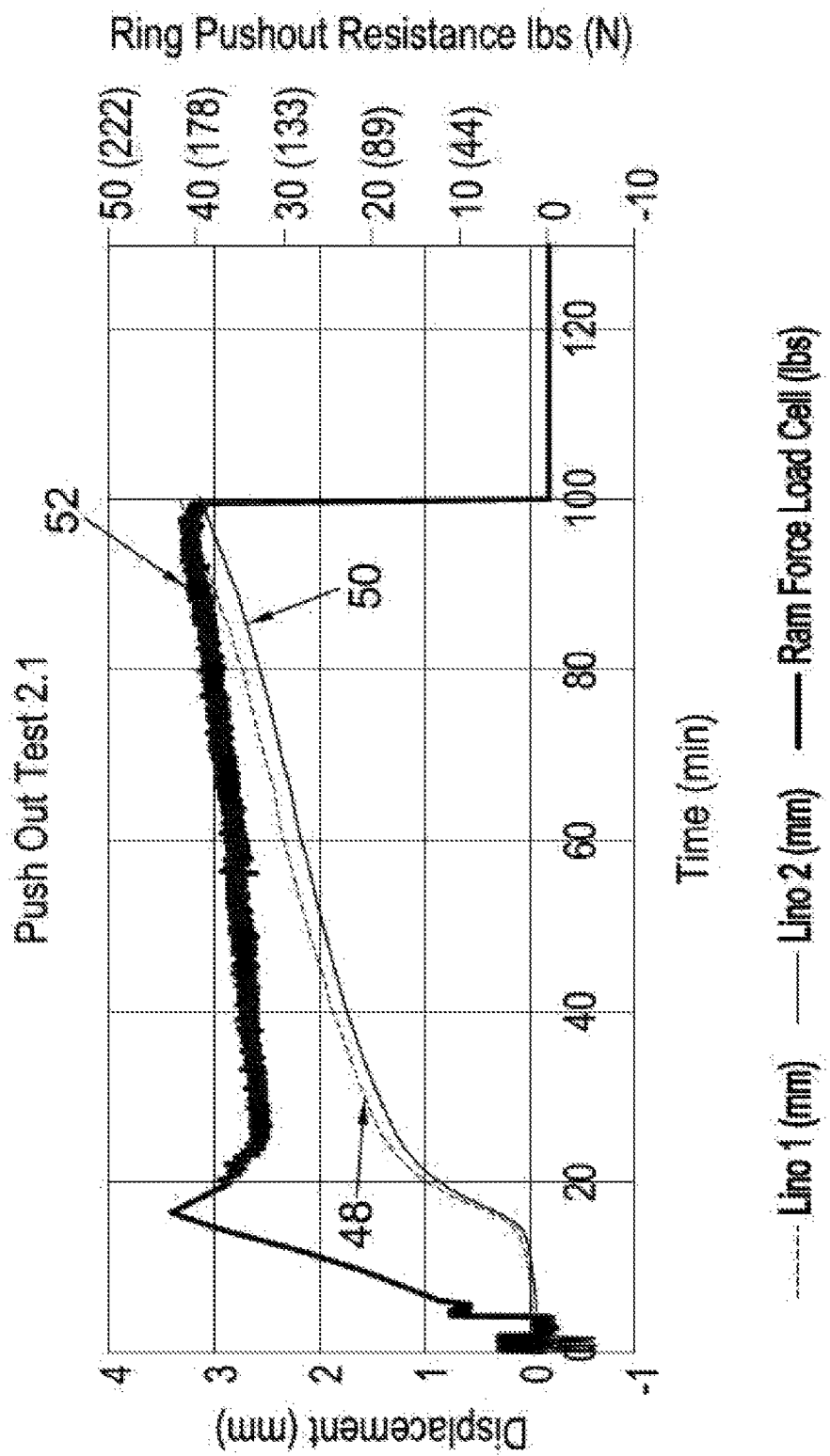
FIG. 9 shows the results for a push-out test carried out at three different pressure levels (a) 0 MPa, (b) 13.8 MPa, and (c) 27.6 MPa. The graphs show the time history results for friction resistance force and displacement, where Lino 1 (48) and Lino 2 (50) refers to the linear displacement transducers at two separate locations that measure the movement of the ring relative to the test apparatus.
Figure 9B:
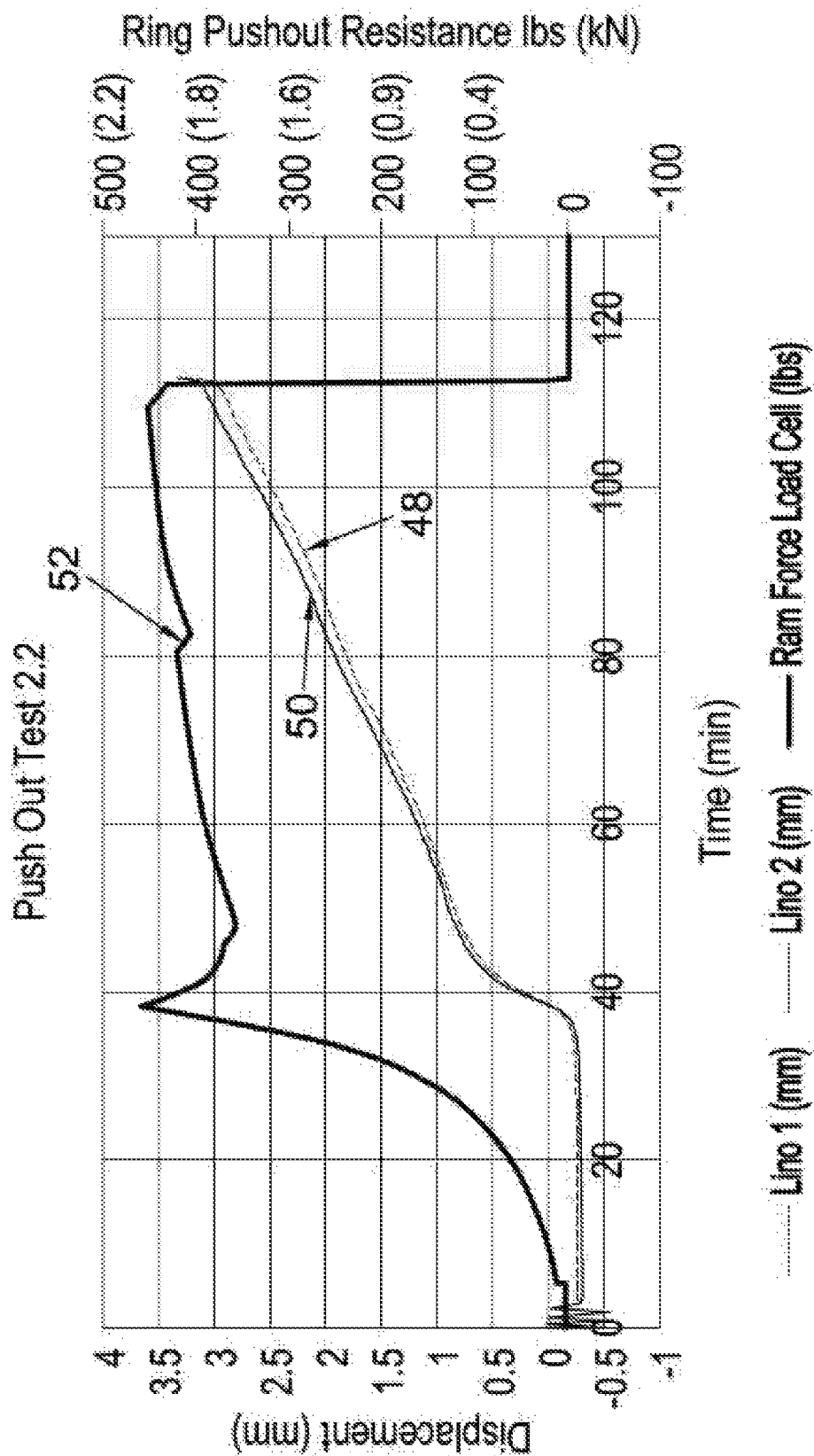
Figure 9C:
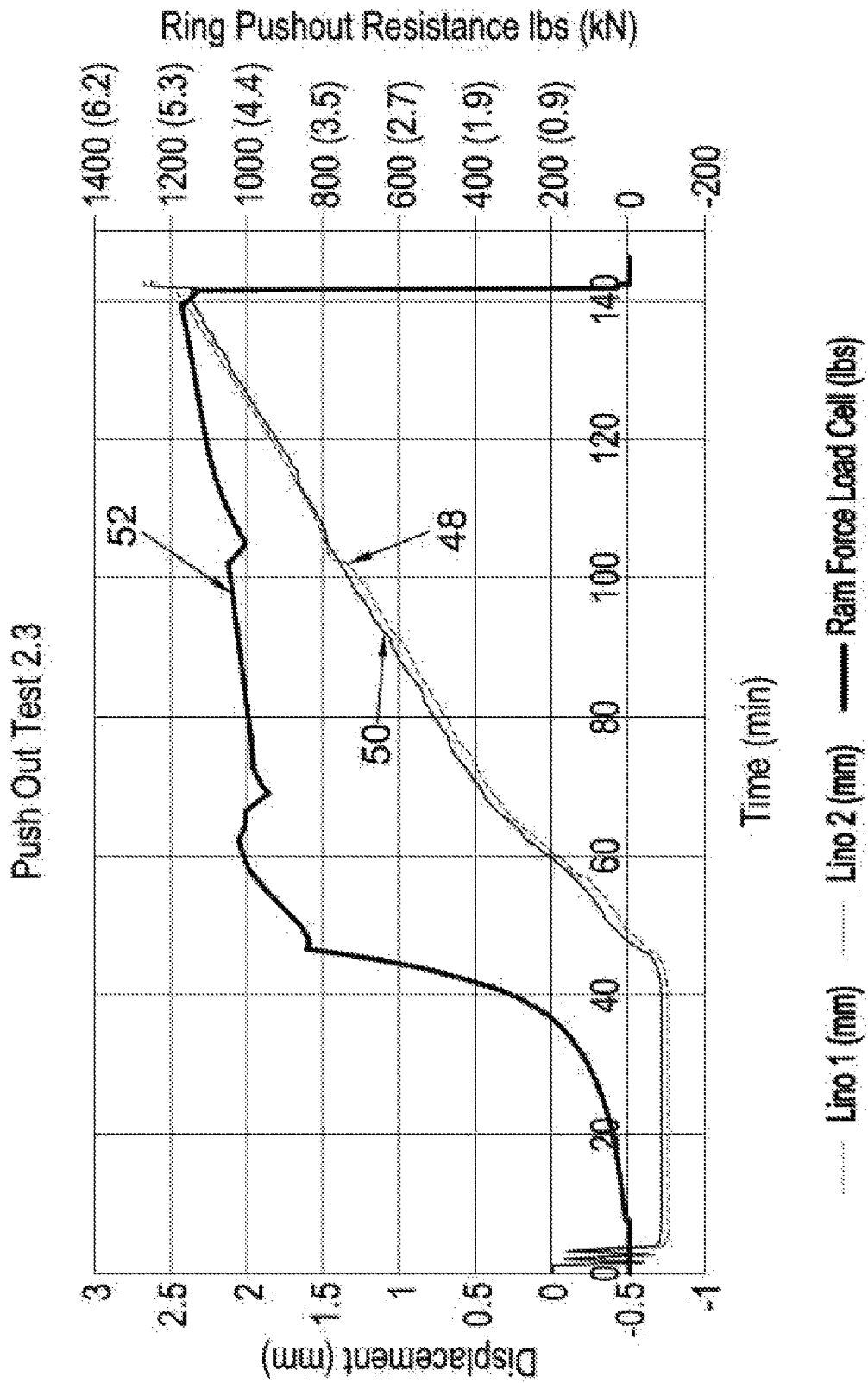
Figure 10A:
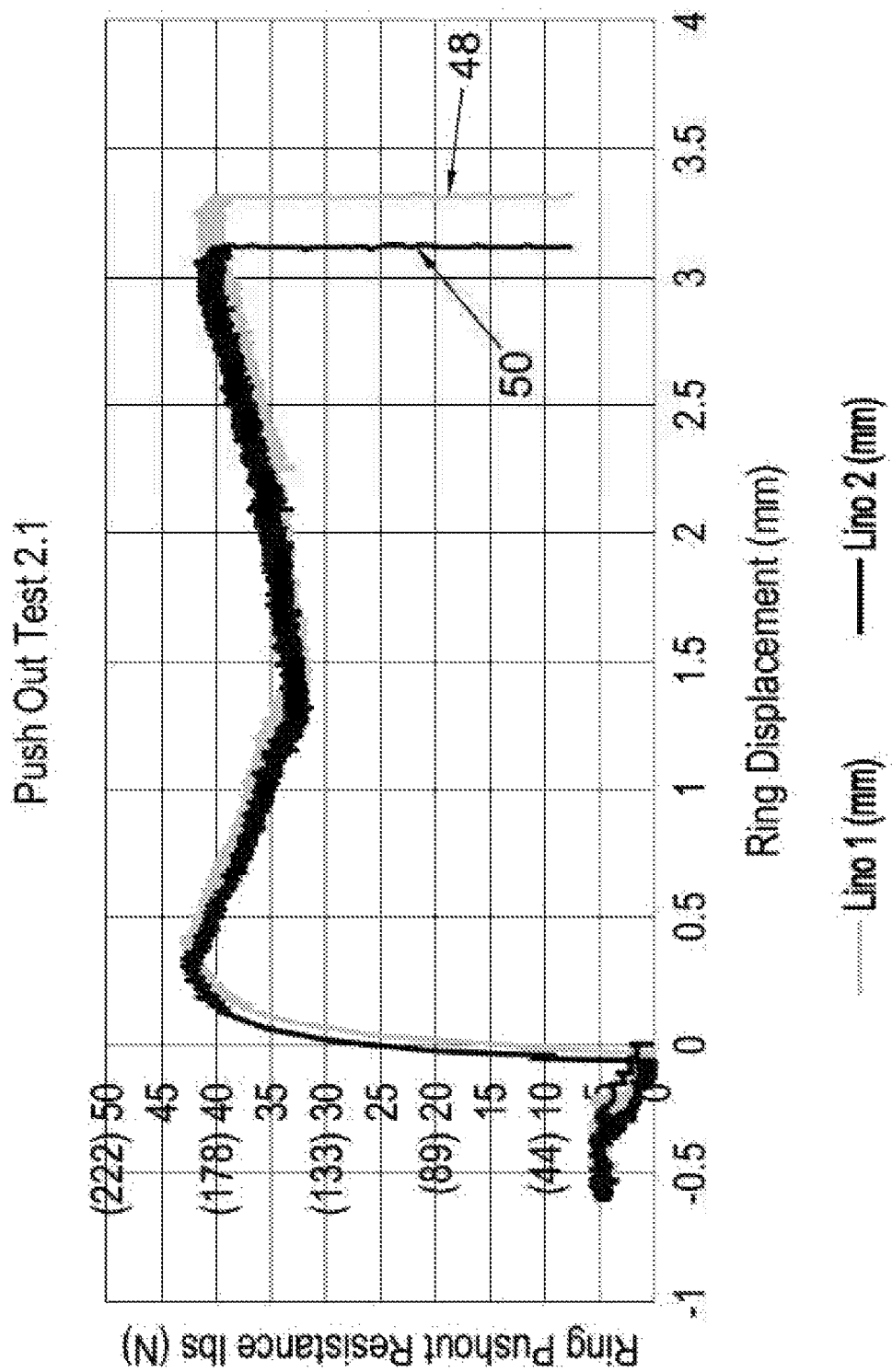
FIG. 10 shows the results for a push-out test carried out at three different pressure (a) 0 MPa, (b) 13.8 MPa, and (c) 27.6 MPa. The graphs show the friction resistance force versus ring lateral displacement, where Lino 1 (48) and Lino 2 (50) refers to the linear displacement transducers at two separate locations that measure the movement of the ring.
Figure 10B:
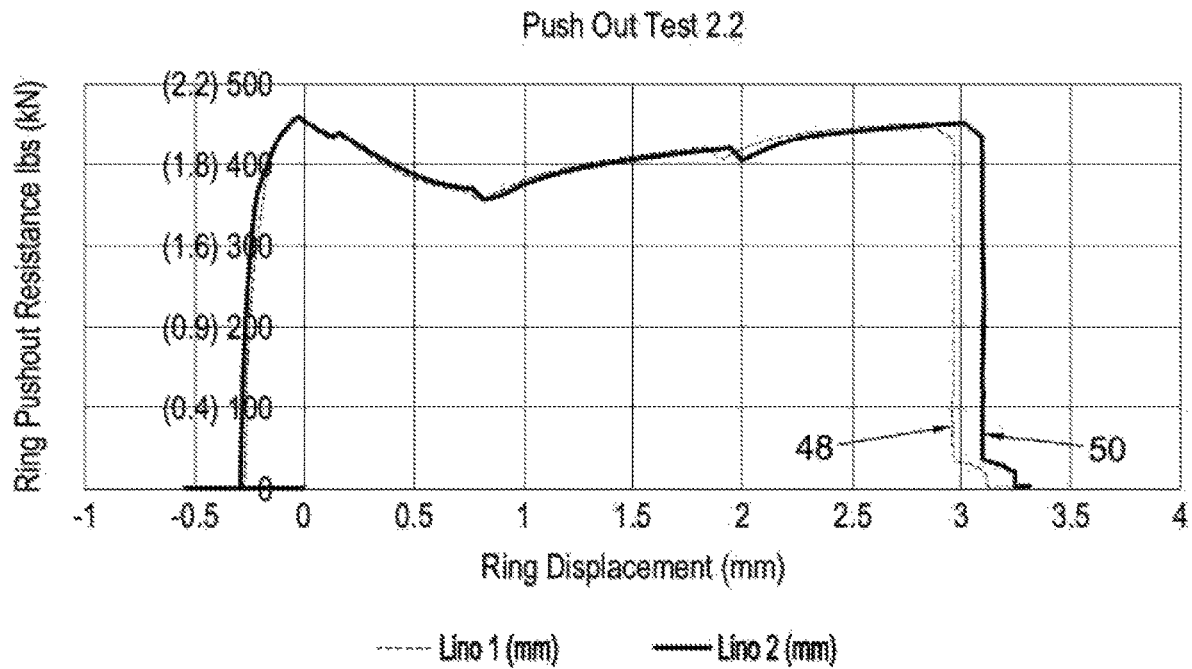
Figure 10C:
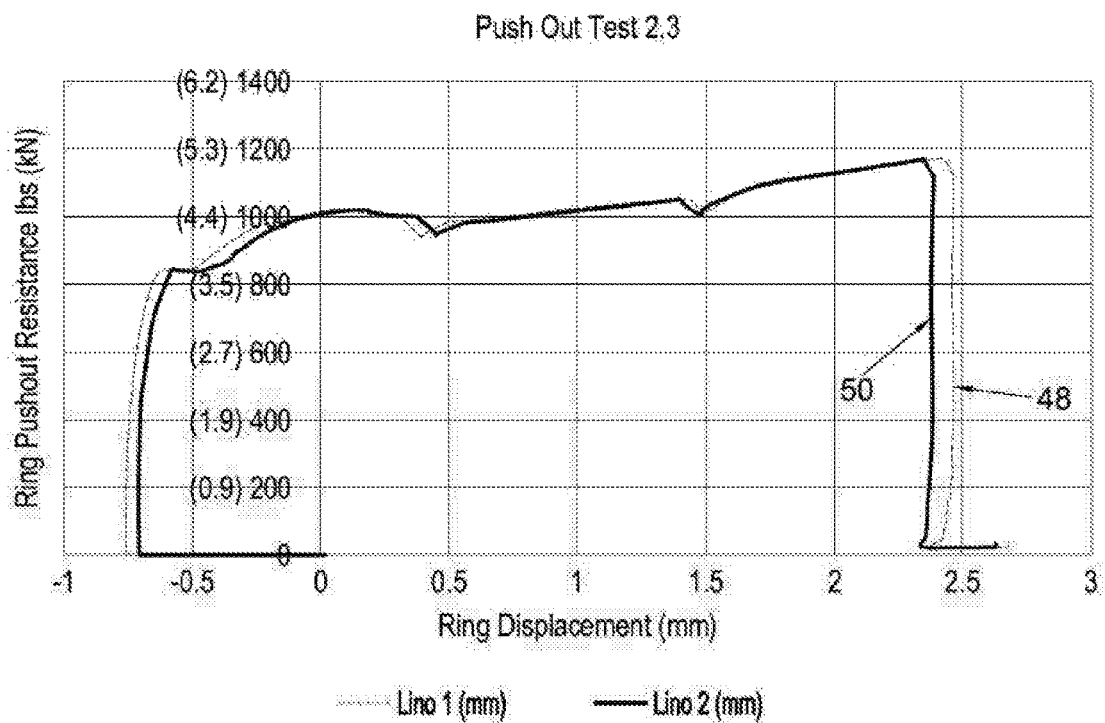

The results are shown in FIGS. 9 and 10. The results showed that after a very small movement of the steel ring relative to the sealing ring (about 0.1 mm), the lateral restraint force, (i.e. the ram force (52)) remained substantially constant (FIG. 9). The results also showed that the ram forces were quite small for the case of no pressure applied to the testing equipment. This confirms that the rubber sealing ring is subjected to very little deformation at the start of any pressure collapse test for which the equipment will be used for. The resisting force applied by the sealing ring increases as the pressure applied to the test ring is increased.

Those skilled in the art will appreciate that the presently disclosed methods and apparatus teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and apparatuses, which, as a matter of language, might be said to fall there between.

The invention claimed is:

1. An apparatus for testing rings cut from pipes for use in making subsea pipelines, the apparatus comprising:
    first and second test chamber sections which when connected together define a test chamber for housing a test ring;
    a seal that engages and seals against the ring when mounted in the chamber to form a pressure resistant seal between an inside of the ring and an outside of the ring;
    a fluid inlet port in one of the first and second chamber sections to allow a pressurized fluid to be admitted to the chamber outside the test ring;
    a hydraulic ram for applying a force against the inner surface of the test ring when mounted in the chamber;
    at least one sensor for measuring the force applied to the test ring by the hydraulic ram;
    at least one sensor for measuring the movement of the test ring; and
    at least one sensor for measuring strain and deformation of the test ring.

2. The apparatus according to claim 1, comprising a pump for pumping fluid to the hydraulic ram.

3. The apparatus according to claim 2, wherein the pump for pumping fluid to the hydraulic ram is a needle pump.

4. The apparatus according to claim 1, wherein the at least one sensor measuring the movement of the test ring, is a displacement transducer.

5. The apparatus according to claim 1, wherein the apparatus comprises at least two sensors for measuring the movement of the test ring relative to the test apparatus.

6. The apparatus according to claim 1, wherein the at least one sensor for measuring the force applied to the test ring by the hydraulic ram is a force meter.

7. The apparatus according to claim 1, further comprising a spacer ring, positioned between the first and second sections, and taken with the first and second sections to define the test chamber for receiving the test ring.

8. A method for determining whether a test ring is correctly assembled in a test chamber for testing pipes for use in making subsea pipelines, wherein the test ring is cut from a pipe of the type used to make the pipeline and has flat substantially parallel surfaces on the ends of the test ring, the method comprising:
    mounting the test ring in a pressure chamber such that the ends of the test ring form seals with opposing surfaces of the chamber to isolate an inside of the test ring from an outside of the test ring;
    applying a force to an inner surface of the test ring;
    measuring a displacement of the test ring and measuring the force applied to the inner surface of the test ring; and
    using the displacement measurement and force measurements to determine whether the test ring is correctly mounted in the pressure chamber.

9. The method according to claim 8, comprising stopping the applied force to the inner surface of the test ring once the test ring has been displaced by a predetermined distance.

10. The method according to claim 8, comprising providing a pressure of above 0 MPa and below an expected collapse pressure to the pressure chamber, when applying a force to the inner surface of the test ring.

11. The method according to claim 8, wherein the method further comprises determining a range of allowable restraining forces before mounting the test ring in the pressure chamber, applying the force to the inner surface of the test ring, and measuring the displacement of the test ring and measuring the force applied to the inner surface of the test ring.

12. The method according to claim 8, wherein the method further comprises maintaining the test ring in the pressure chamber and carrying out an external pressure collapse test on the test ring.

13. The method according to claim 12, wherein the external pressure collapse test comprises:
    increasing the pressure outside the test ring and measuringthe strain and deformation on the test ring as the pressure increases; and
    determining the external collapse pressure of the test ring.

14. The method according to claim 13, wherein determining the external collapse pressure of the test ring comprises determining a comparison of pressure applied to the outside of the ring and maximum strain measured to detect the onset of accelerating non-linear reduction in ring diameter with increasing pressure.

15. A method for testing pipes for use in making subsea pipelines, comprising:
    cutting a ring from a pipe of the type used to make the pipeline,
    forming flat substantially parallel surfaces on ends of the ring to provide a test ring;
    mounting the test ring in a pressure chamber such that the ends of the test ring form seals with opposing walls of the chamber to isolate an inside of the test ring from an outside of the test ring;
    applying a force to an inner surface of the test ring;
    measuring a displacement of the test ring and measuring the force applied to the inner surface and using the displacement measurements and force measurements to determine whether the test ring is correctly assembled in the pressure chamber;
    increasing a pressure outside the test ring and measuring strain and deformation on the test ring as the pressure increases; and
    determining a comparison of pressure applied to the outside of the test ring and maximum strain measured to detect the onset of accelerating non-linear reduction in test ring diameter with increasing pressure.

16. The method according to claim 15, wherein applying a force to the inner surface of the test ring, comprises applying the force until the applied force to the test ring exceeds the lateral resisting force.

17. The method according to claim 15, wherein applying a force to the inner surface of the test ring includes providing an apparatus for applying a force to the inner surface of the test ring.

18. The method according to claim 17, wherein providing an apparatus for applying a force to the inner surface of the test ring comprises providing a hydraulic ram, wherein the hydraulic ram is connected to a pump for supplying a fluid to the hydraulic ram.

19. The method according to claim 17, wherein the apparatus for applying a force to the inner surface of the test ring is removed from the test ring before increasing the pressure outside the ring.

20. The method according to claim 15, wherein applying a force to the inner surface of the test ring comprises applying a rate of force of from about 0.002 kN/min to about 0.04 kN/min.

21. A pipe testing apparatus for performing the method according to claim 15.

* * * * *